United States Patent Office 3,832,140
Patented Aug. 27, 1974

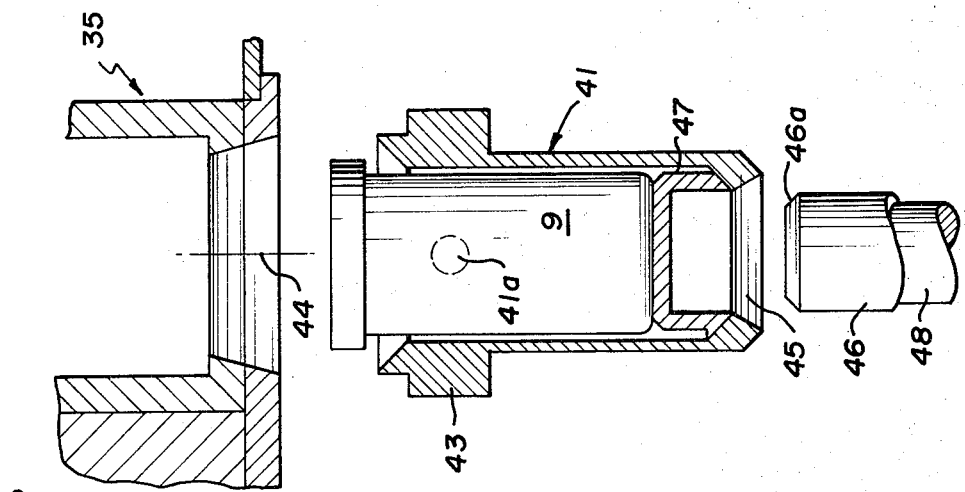
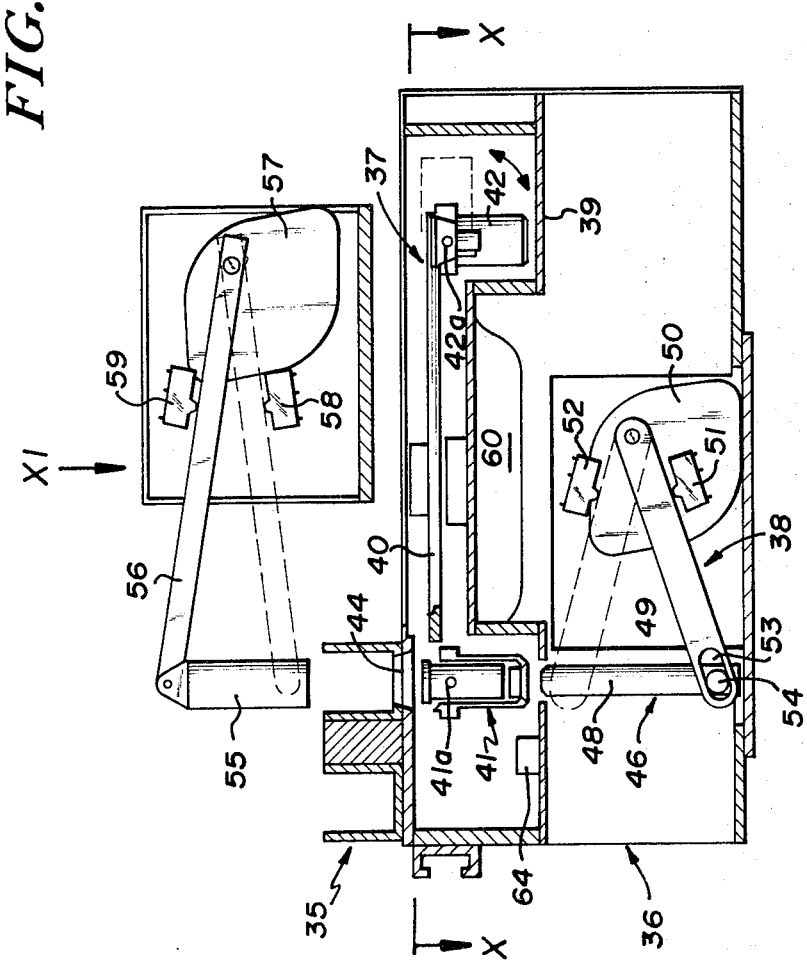

3,832,140
AUTOMATED APPARATUS FOR CHEMICAL
ANALYSES
Eckehard Lorch, Reinach, Paul Sommer, Pratteln, and Hansjorg Tschirky, Ettingen, Switzerland, assignors to Hoffmann-La Roche, Inc., Nutley, N.J.
Filed Apr. 24, 1972, Ser. No. 247,052
Int. Cl. G01n 33/00, 33/16
U.S. Cl. 23—259                                    12 Claims

ABSTRACT OF THE DISCLOSURE

An apparatus for automatically performing chemical analyses comprising at least 2 unit-assembly elements each bearing at least one endless conveyor having a sliding surface which has disposed thereon a number of sample containers and which is adapted for intermittent movement of the sample containers to various stations for treatment or testing, is described.

BRIEF SUMMARY OF THE INVENTION

The invention relates to an apparatus for automatically performing chemical analyses comprising at least one endless conveyor having disposed thereon a number of sample containers and adapted for intermittent movement of the sample containers to various stations for treatment or testing. More particularly, each conveyor has an endless horizontal sliding surface bounded by vertical side walls and said surface has disposed thereon a continuous chain of cylindrical conveying members. The conveying members are in separate adjacent relationship to one another and open at both ends, the sample containers resting inside the conveying members on the sliding surface. A drive means is disposed at least at one place on the conveyor to move intermittently the conveying members and sample containers on the sliding surface.

The samples preferably contain specimens taken from human subjects and are to be analyzed for diagnostically significant indications.

BACKGROUND OF THE INVENTION

There are various known forms of means for automatically performing chemical analyses, the aim of which is largely to automate the steps in an analysis previously performed manually. In a known apparatus of such kind, the conveyor comprises a turntable which is rotated stepwise, for example, by a programmer. During the process, the samples which are disposed on the periphery of the turntable, move from one treatment or test station to another to complete the various steps in the analysis, such as, for example, the addition of reagents, agitation, cooling or heating. The aforementioned turntable devices are adapted to a particular analysis program and cannot suitably be extended to other analyses due to reasons of construction and owing to shortage of space. If turntables are used, the execution of complex analytical programs, such as those occurring, for example, in clinical diagnoses, and frequently in industrial laboratories, is very time-consuming and often impossible because it is difficult to combine different analysis channels and consequently it is very difficult to transfer samples. Often the samples need to be centrifuged, but the available devices cannot be modified to incorporate such an operation as part of the automated process.

It is also known to convey the samples on conveyors from one treatment station to another. However, existing constructions based on this principle have the same basic disadvantages as mentioned in connection with turntable devices.

DETAILED DESCRIPTION OF THE INVENTION

The present invention obviates these disadvantages. The apparatus of the invention comprises at least one conveyor which has an endless horizontal sliding surface bounded by vertical side walls on which is disposed a continuous chain of separate cylindrical conveying members in adjacent relationship to one another and open at both ends, sample containers resting inside the conveying members on the sliding surface, and a drive means disposed at least at one place on the conveyer to move intermittently the conveying members and sample containers on the sliding surface.

Advantageously, the aforementioned conveyor comprises two parallel conveying portions connected at both ends by semicircular reversing conveying portions.

In a special embodiment, the conveyor or each conveyor is made up of unit-assembly elements, the drive means is disposed at one or both reversing conveying portions and comprises a horizontally-disposed star wheel whose vertical axis of rotation extends through the center of the semicircular reversing conveying portion and whose peripheral tooth pitch is dimensioned so that when the star wheel rotates, one tooth at a time grips a cylindrical conveying member and moves it forward.

The aforementioned apparatus, in contrast to all known automatic analyzing devices, can link any number of analysis channels for similar or different samples in a very small space, so that even complicated analytical programs can be automated without difficulty. Consequently, the apparatus can be extended in any manner to any number of stations in an existing analysis channel. More particularly, there is no difficulty in transferring samples.

In yet another embodiment, one of the aforementioned unit-assembly elements is disposed above and combined with a centrifuge. The conveyor of the unit-assembly element is adapted with an aperture in the neighborhood of the centrifuge. A vertical conveyor is disposed at the unit-assembly element for conveying the sample containers to the centrifuge and returning them to the conveyor after centrifuging.

Advantogeusly, the aforementioned vertical conveyor comprises a motor-driven ram which can be lowered below the sliding surface of the conveyor in the neighborhood of the aforementioned aperture. The centrifuge for receiving the sample containers is a bearing member which is practically cylindrical and whose lower opening is adapted to the ram, which is somewhat smaller in diameter, so that when the ram bearing a sample container moves downwards, it travels through the bearing member and leaves the sample container in it. Advantageously, the lower part of the bearing member comprises an insert made of ferromagnetic material and covering the lower aperture of the bearing member, and the ram comprises a permanent magnet at its upper end portion facing the aforementioned insert.

A second ram, which may be raised and lowered and whose motion is adjusted to that of the first ram, is disposed above the aperture provided in the conveyor.

Thus, the device according to the invention is extremely flexible and is preferably used for rapidly performing routine analyses. The automatic process can include a great variety of steps, such as saponification, precipitation, extraction, elution or the like.

An embodiment of the apparatus according to the invention is shown in the drawings, in which:

FIG. 6 is a vertical cross-section showing how a heating member can be incorporated and also showing the position of the sample containers on the conveyor;

FIG. 7 is a sectional view of a unit-assembly element comprising a centrifuge;

FIGS 8 and 9 show details from FIG. 7;

Figure 1:
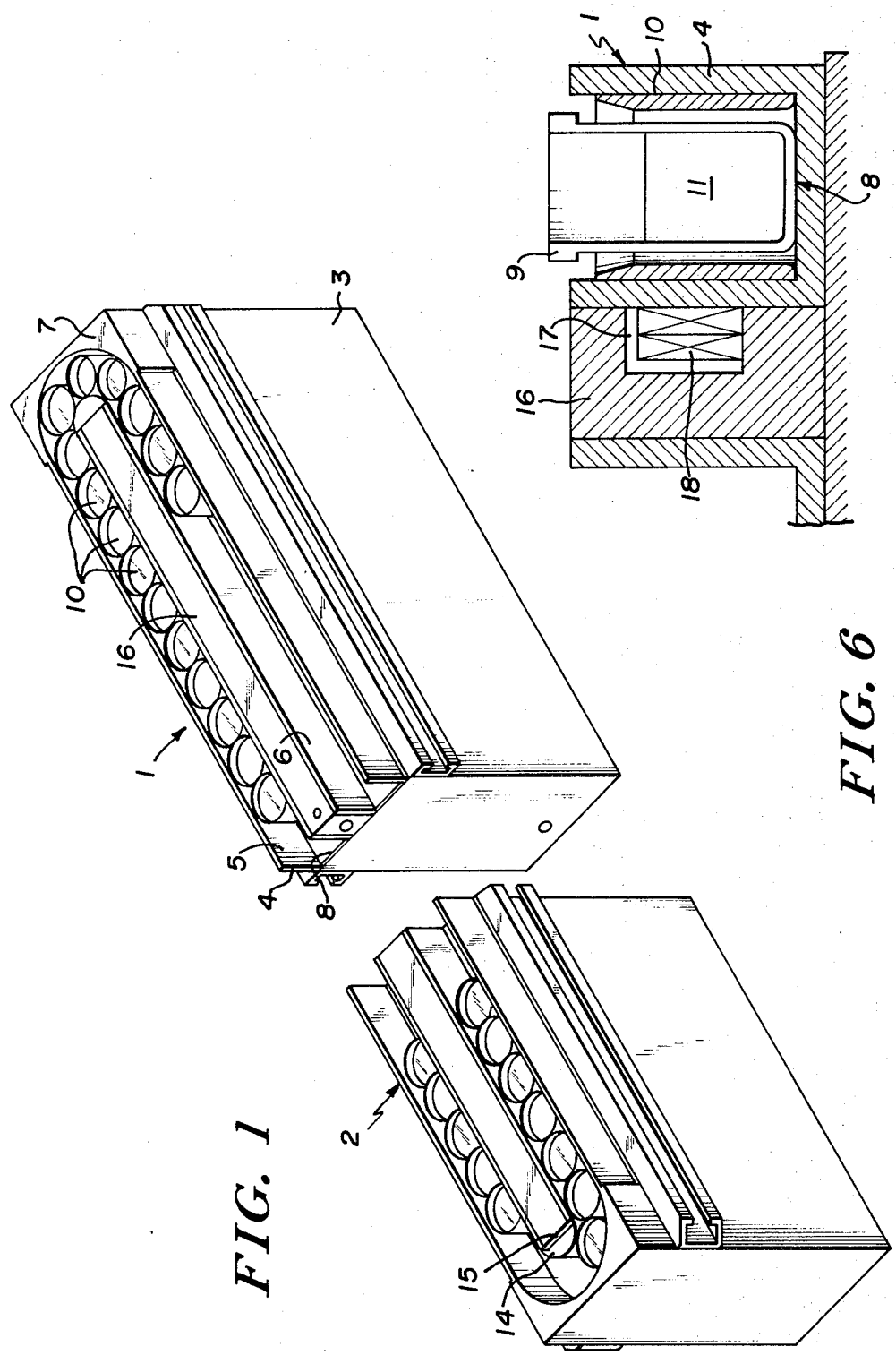
FIG. 1 is a perspective view of two unit-assembly elements which can be combined to form a simple analysis channel.

The perspective diagram in FIG. 1 shows two unit-assembly elements 1 and 2. Since the two elements are identical apart from the drive means, the following description will refer to 1 only. Each element comprises a box-shaped bearing member 3 on which a conveyor 4 is secured. The conveyor 4 comprises two parallel conveyor troughs 5 and 6 connected by a semicircular end portion or reversing conveying portion 7, giving a horseshoe-shaped sliding surface 8 bounded by vertical side walls. Unit-assembly elements 1 and 2 can be assembled to form a closed, endless, trough-shaped conveyor on which the samples for analysis are moved in steps.

The sliding surface 8 of the conveyor bears a continuous chain of conveyor members 10, loosely disposed adjacent to one another. As FIG. 6 shows, members 10 are cylindrical and open at both ends. Each conveyor member 10 contains a sample container 9, preferably a cylindrical glass vessel, which contains the sample 11 and rests on the sliding surface 8 of the conveyor.

Figure 2:
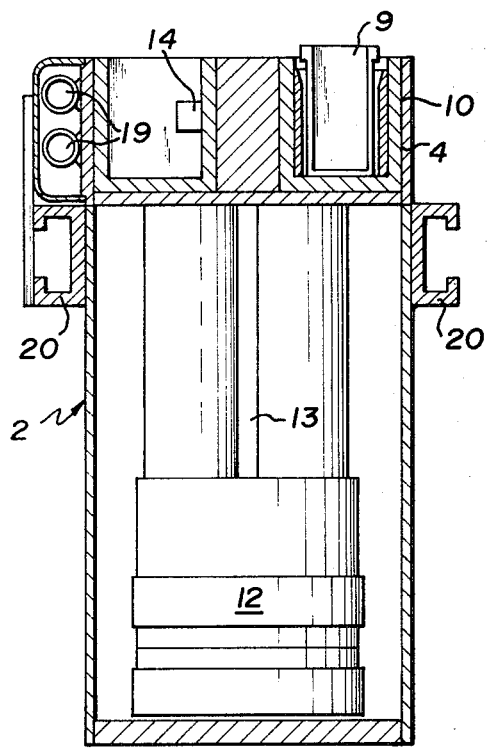
FIG. 2 is a vertical cross-section of one of the unit-assembly elements in FIG. 1.
Figure 3:
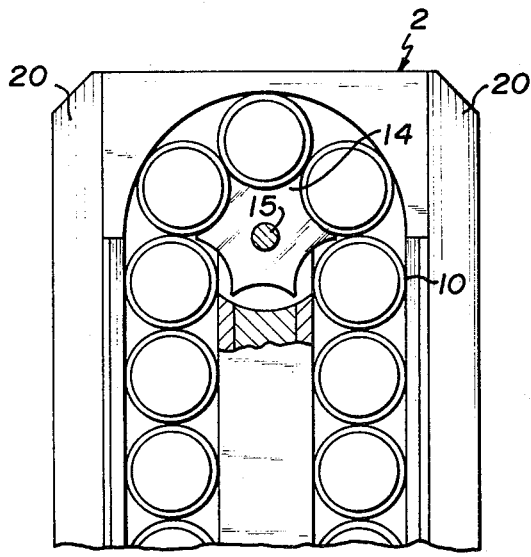
FIG. 3 is a plan view of the end portion of a unit-assembly element provided with the driving means.

FIG. 2 shows motor means 12 such as, for example, an electric motor whose output shaft 13 is coupled to a star wheel 14 and is disposed in the lower part of the unit-assembly element 2, FIGS. 1 and 2. The star wheel 14, which is at the end portion of the conveyor, is disposed about halfway up the conveying members 10 so that, as shown in FIG. 3, its vertical axis of rotation 15 lies at the center of the semicircular arc which the conveying members describe at the aforementioned portion of the conveyor.

The tooth pitch of wheel 14 is such that each time the star wheel rotates, one of its teeth grips and conveys a member 10. The teeth are formed with concave arcs having a curvature at least as great as that of the conveying members. The propulsion exerted by star wheel 14 is transferred by one conveyor member 10 to the next conveyor member 10 so that the entire chain of members 10 moves forward on the sliding surface. Of course, another contributing factor to the forward motion is the coefficient of friction between, on the one hand, the material of the conveying members and the sample containers and, on the other hand, the conveyor. Excellent results can be obtained, for example, with glass sample containers 9, stainless steel conveyor members 10 and a conveyor, particularly conveyor troughs 5 and 6, made of anodized aluminum or "Teflon".*

As FIG. 6 also shows, the central web 16 of the conveyor can have a recess 17 in which a heating means 18, such as, for example, an electric heater, can be inserted. Accordingly, samples 11 in the neighboring conveyor portion can be brought to or maintained at a prescribed temperature.

Alternatively, the samples can be cooled by suitable cooling means. To this end, for example, as shown in FIG. 2, one or more tubes 19 through which a cooling medium flows can be disposed along the outer surface of a conveyor portion. The tubes 19 can be secured to assembly cross-sectional members 20 which are preferably disposed on both sides of the conveyor and are used for assembling the required devices and apparatus such as conveying devices and agitators. The aforementioned tubes 19 can, of course, also be used for heating by flowing heat through tubes 19.

Figure 4:
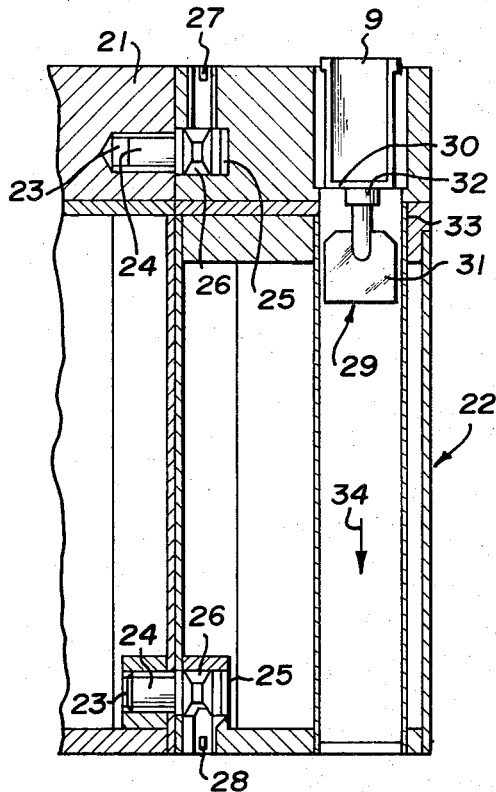
FIG. 4 is a cross-section showing how two adjacent unit-assembly elements are coupled.

FIG. 4 shows how two adjacent unit-assembly elements are coupled. The two elements 21 and 22 have two overlapping bores in their central regions. The two bores 23 of elements 21 are internally threaded and each bears a threaded pin 24 whose free portion extending into the bore 25 of elements 22 which has an inwardly tapering annular groove 26. Threaded pins 27 and 28 extending from above and below, respectively, into the groove, have front, conically tapered points which when screwed in bear against a boundary surface of grooves 26, respectively, and which, when screwed further, press pins 24 and consequently the entire element 21 against element 22, producing a reliable, substantially gapless joint.

Of course, one skilled in the art can easily replace the aforementioned coupling by another known construction without interfering with the operation of the conveyor.

Figure 5:
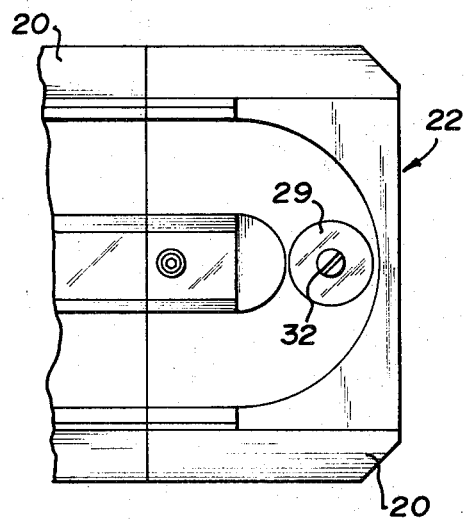
FIG. 5 is a plan view corresponding to FIG. 4.
Figure 11:
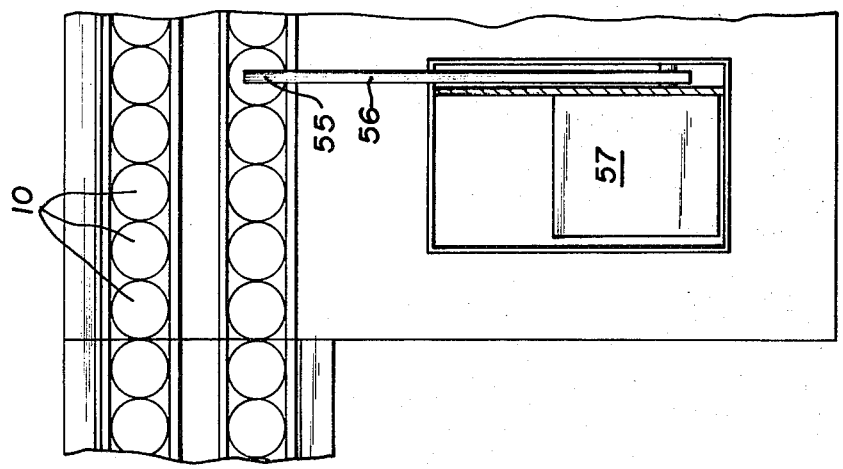
FIG. 11 shows a detail of FIG. 10.

When desired, as shown in FIGS. 4 and 5, sample containers 9 are ejected from the described apparatus through an aperture which is formed in the conveyor sliding surface 8 and can be closed by a plug 29. Plug 29 comprises two parts 30 and 31 held together by a screw 32. When screw 32 is tightened, parts 30 and 31 are brought together so that a rubber band 33 located in an annular groove is pressed outwards and thus secures plug 29 in the bore. The aforementioned plug 29, the construction of which is similar to those used in thermos flasks, can easily be loosened if necessary, whereupon the used sample containers fall out in the direction of arrow 34. The conveying members when empty, can easily be filled with new, empty sample containers by known automatic filling apparatus. The result is a practically endless chain of glass vessels, whose capacity is limited not by the length of the conveyor but only by the capacity of the aforementioned additional filling device.

Owing to the construction of the conveyor and the unit-assembly of the invention, one of the unit-assembly elements can be directly combined with a centrifuge. Such a combination is shown in FIGS. 7–11.

The conveyor 35 is adjacent to a housing 36 containing a centrifuge 37 and a vertical conveyor 38. The centrifuge 37, which is mounted, for example, on an intermediate bottom 39, has a centrifuge arm 40 having a bearing member 41 at one end and a counterweight 42 at the other end. Member 41 and counterweight 42 can both pivot outwardly under the influence of centrifugal force, around axes 41 and 42a, respectively. Member 41 is a hollow cylinder and its upper region comprises, as shown in FIG. 9, an annular flange 43, the diameter of which is larger than that of an ejection aperture 44 located immediately above in the conveyor. The dimensions of aperture 44 are such that sample container 9 arriving above it is conveyed downwards into the bearing member 41 underneath. The bottom of member 41 has an aperture 45 whose diameter is at least equal to the diameter of a ram 46 located below. As FIG. 9 shows, the sample container 9 rests on a special insert 47. The hollow ram 46, which is vertically guided on a stationary, vertical pin 48, is connected to a driving means 50, for example, a motor, via a pivot arm 48. When pivot arm 49 reciprocates between two limit switches 51 and 52, it moves ram 46 backwards and forwards about a pin 54 mounted in slot 53.

A second ram 55, disposed above the ejection aperture 44, is connected to a driving means 57, for example, a motor, by a pivot arm 56. Ram 55 is vertically guided by its own weight, and each time the pivot arm 56 pivots, it actuates one of limit switches 58 and 59.

The aforedescribed apparatus operates as follows. We shall assume that the ram 46 is in its top position, as

---

*A fluorinated ethylene-propylene resin.

shown by the chain-dotted position of pivot arm 49, in which the top edge of insert 47 is at the same level as the sliding surface of conveyor 35. As soon as sample container 9 reaches insert 47, ram 46, insert 47 and sample container 9 are lowered under programmed control until the sample container rests in the bearing member 41 of the centrifuge. Thereafter, ram 46 sinks still lower in order to allow the centrifuge arm to rotate. The sample container is prevented from catching in the conveyor aperture 44 by ram 55 which, as a precaution, follows the motion of the sample container and helps to overcome an unforeseen frictional resistance, if required. The program control system then switches the centrifuge motor 60 to maximum speed in two stages, and the sample is centrifuged. Next, the ram 46 travels upwardly again and moves the specimen or sample container 9 back to the container sliding surface, where it remains until the row of sample containers has been moved forward by a distance equal to the diameter of a sample container, and until the next container has been lowered for centrifuging.

Preferably, insert 47 is made of ferromagnetic material and a permanent magnet is incorporated, as shown in FIG. 9, in head 46a of ram 46. This ensures that the insert 47 is reliably driven by ram 46.

Of course, the aforedescribed apparatus does not function efficiently unless the centrifuge bearing member 41 always returns automatically after centrifuging to its starting position below the ejection aperture 44 of the conveyor. To this end, as shown in FIG. 10, a known resetting cardioid 61, in cooperation with a resetting arm 62 and a ball bearing 63 secured thereto, acts on the centrifuge arm 40 so that it is automatically pressed into the required position.

As soon as the sample for centrifuging is introduced into the centrifuge, a motor means 69 pivots the resetting arm 62 outward and the centrifuge rotor can be brought to its maximum speed in two stages, as shown in FIG. 7, by a motor 60 comprising a disc rotor which is of very flat construction but has a good torque.

A moisture-sensing device 64 located at the bottom 39 of the interior of the centrifuge switches off the entire installation in the event a sample container breaks.

Figure 10:
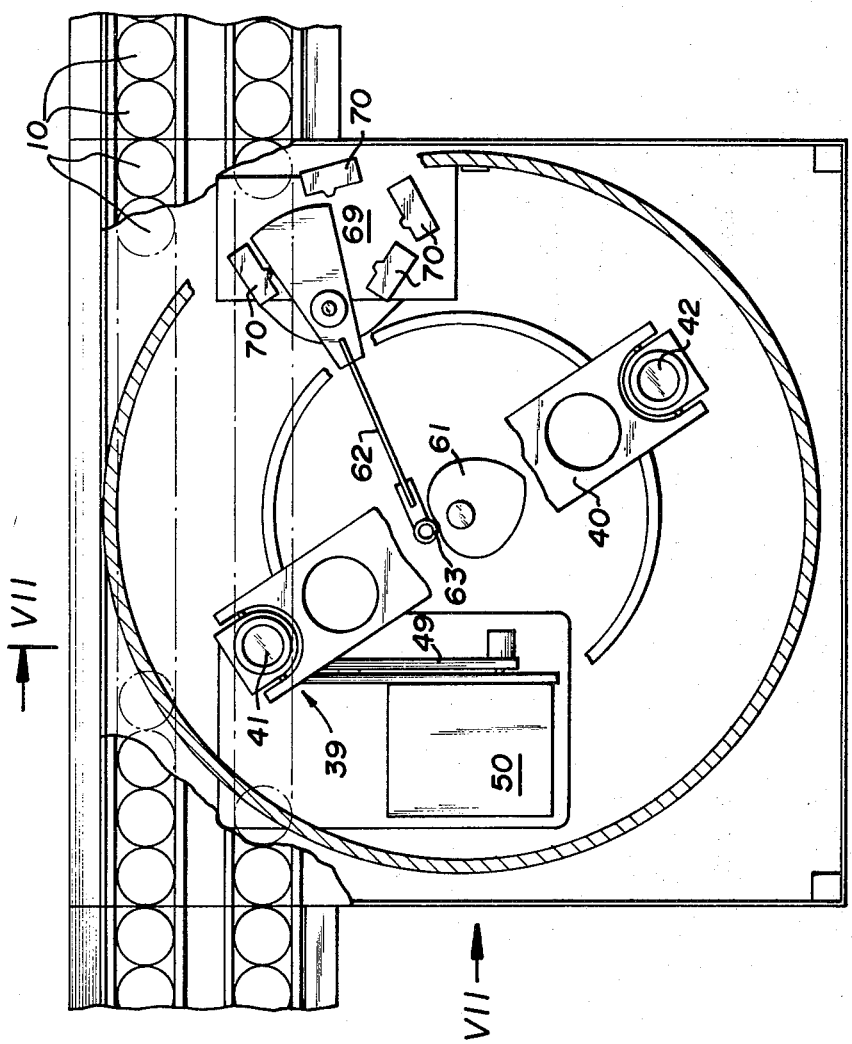
FIG. 10 is a plan view of the unit-assembly element shown in FIG. 7 taken along line X—X of FIG. 7.

For the sake of simplicity, resetting mechanism comprising 61, 62 and 63, as shown in FIG. 10, is omitted from FIG. 7.

Switches 70, in FIG. 10, disposed in the pivoting region of the resetting arm 62 control motors 50, 57 and 60, and motor 69 which pivots the resetting arm 62. The required electric circuitry is known to one skilled in the art and is therefore not described.

Figure 12:
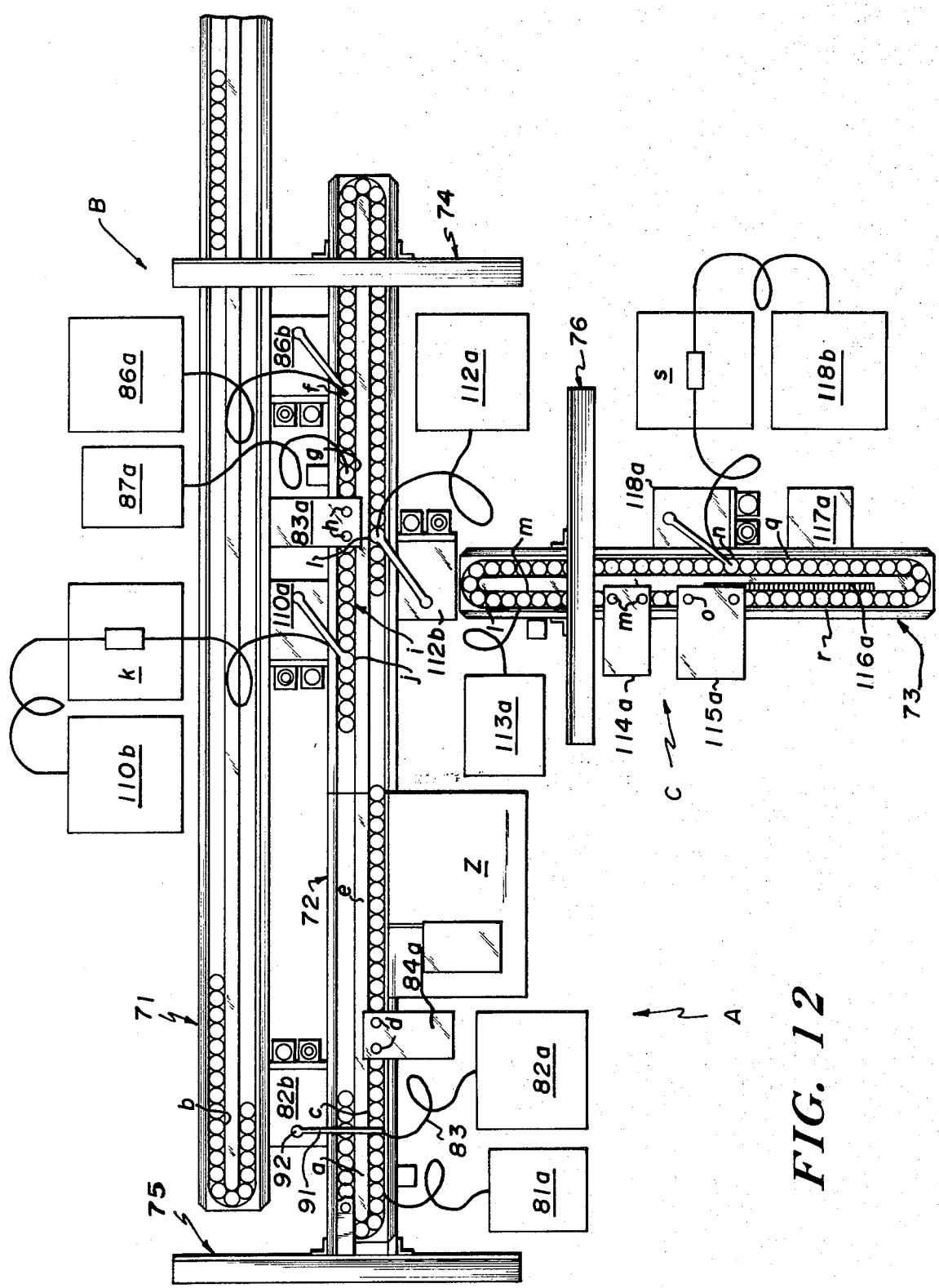
FIG. 12 is a diagrammatic plan view of the apparatus of the invention, consisting of a combination of a number of unit-assembly elements, for automatically performing analyses.

FIG. 12 is a diagram of a complete installation for automatically performing chemical analyses. The following is an example showing how the apparatus, as shown in FIG. 12, can be utilized to determine plasma glucose and urea, after removal of protein.

A. Removal of protein a. Preliminarily, 1.0 ml. of 15% zinc sulfate solution from dispenser 81a is introduced into a sample container.
b. 0.15 ml. of the specimen is measured out by diluter 82a and conveyed by unit 82b.
c. Subsequent washing with 1.4 ml. 0.5 N sodium hydroxide from diluter 82a.
d. Agitation twice, each time for 90 seconds, in agitator 84a.
e. Centrifuging in centrifuge Z.

B. Glucose f. Transfer of 0.2 ml. of the supernatant liquid to the parallel channel, followed by washing with 0.8 ml. acetate buffer solution (pH 5.6) from diluter 86a.
g. Addition of 0.8 ml. of a mixture of glucose oxidase, peroxidase and chromogen from dispenser 87a.
h. Agitation once, in agitator 83a.
i. Incubation at room temperature for 12 minutes.
j. Transfer of material under observation to colorimetric cell after washing utilizing transfer device 110a and measuring pumps 110b.
k. Measurement at a wave length of 632 nm., the result being recorded on an electronic continuous recording device. Measuring range 0–300 mg. glucose in 100 ml. plasma.

C. Urea l. At the same time as above, 0.05 ml. of the sample is measured out after removal of protein and centrifuging. It is then washed with 0.9 ml. diacetyl monoxime solution from diluter 112a.
m. Addition of 1.0 ml. of a mixture of dilute sulfuric and phosphoric acid from dispenser 113a.
n. Agitation once in agitator 114a.
o. Test-tube sealed with a glass ball 115a.
p. Incubation on the system heated to 95° C. for 15 minutes heating device 116a.
q. Removal of glass ball 117a.
r. Transfer of substance under observation, after preliminary washing, to the colorimetric utilizing cell transfer device 118a and measuring pump 118b.
s. Measurement in the photometer at a wave length of 540 nm., the measurement being recorded on an electronic continuous recording device. Measuring range 0–200 mg. urea in 100 ml. plasma.

It can be assumed that the additional devices, such as agitators, centrifuges, dispensers, diluters, measuring pumps, transfer devices, photometers, and the like, used in connection with the aforementioned apparatus, are known to those skilled in the art.

The apparatus shown comprises three endless conveyors 71, 72 and 73. After use, the test tubes are ejected through apertures in the conveyors, (compare plug 29 in FIGS. 4 and 5) and are replaced by new, empty tubes. Known tube distributors 74, 75 and 76 are used to insert new test tubes in the conveyor. Subsequently, the specimen containers are conveyed at discontinuous intervals, e.g., at intervals from ⅕ to 999 minutes (equal total cycle), and are controlled by a timer used for the entire apparatus.

At each conveying step, the timer outputs two different pulses. The duration of the first pulse determines the time during which the sample is actively processed, for example, by agitation and centrifuging. The total duration of the first and second pulse determines the total cycle. The ratio of the working cycle to the total cycle can be varied in step of one-tenth of a minute.

The control unit can also be used to select the total number of samples for analysis. To this end, a pulse switches off or switches on an auxiliary system such as a time switch. If a fault occurs, the entire system can be switched off.

The transfer unit 82b is constituted by a mechanical arrangement consisting of a lever 91 one end of which is connected to an axially and rotatably movable shaft 92. To the other end of lever 91 the open end of the diluter hose 83 is secured. Thus by suitable shaft rotation the hose 83 end is brought into a position above one of the sample containers 2 or 3 and by downward movement the hose is immersed into the container for sucking up or discharging liquid. The transfer units 96b, 110a and 112b are of similar construction.

We claim:
1. An aparatus for automatically performing chemical analysis, comprising at least two unit-assembly elements, at least one conveyor having an endless horizontal sliding surface bounded by vertical side walls disposed on each of said unit-assembly elements, a continuous series of cylindrical conveying members disposed on the sliding surface in separate adjacent relationship to one another and open at both ends, sample containers resting inside the conveying members on the sliding surface, and a drive means disposed at least at one place adjacent to the conveyor and adapted to move, intermittently, the conveying members and sample containers on the sliding surface.

2. An apparatus in accordance with claim 1, wherein the conveyor has two parallel conveying portions connected at both ends by semicircular reversing conveying portions.

3. An apparatus in accordance with claim 2, wherein the drive means is disposed at one or both reversing conveying portions and comprises a horizontally-disposed star wheel whose vertical axis of rotation extends through the center of the semicircular reversing conveying portion and whose peripheral tooth pitch is so dimensioned that when the star wheel rotates one tooth at a time grips a cylindrical conveying member and moves it forward.

4. An apparatus in accordance with claim 3, wherein at least at one place on the conveyor, the sliding surface defines an ejection opening having a diameter at least equal to that of the sample containers.

5. An apparatus in accordance with claim 3, wherein at one point a centrifuge is disposed below and combined with the conveyor on the unit-assembly elements.

6. An apparatus in accordance with claim 5, wherein the conveyor defines through the sliding surface an aperture in the neighborhood of the centrifuge, and a vertical conveyor is disposed on the unit-assembly elements in the neighborhood of the aperture and conveys the sample containers to the centrifuge and returns them to the conveyor after centrifuging.

7. An apparatus in accordance with claim 6, wherein the vertical conveyor comprises a motor-driven ram which can be lowered through the aforementioned aperture under the sliding surface of the conveyor and which is adapted to receive the sample containers from a substantially cylindrical bearing member having an upper aperture and lower aperture and being disposed on the centrifuge, the upper aperture of the bearing member being adjusted to the size of the sample container and the lower aperture thereof being somewhat larger in diameter than the ram, so that when the ram bearing a sample container moves downwards, it travels through the bearing member and leaves the sample container therein.

8. An apparatus in accordance with claim 7, wherein the lower part of the cylindrical bearing member comprises an insert made of a ferromagnetic material and covers the lower aperture of the bearing member, and the ram comprises a permanent magnet at its uper end portion facing the aforementioned insert.

9. An apparatus in accordance with claim 8, wherein a second ram, which may be raised and lowered and whose motion is adjusted to that of the first ram, is disposed above the aperture defined by the conveyor.

10. An apparatus in accordance with claim 9, wherein the centrifuge comprises a resetting cardioid which automatically brings the bearing member back to its starting position underneath the conveyor aperture.

11. An apparatus in accordance with claim 10, wherein a heating or cooling means is disposed on the conveyor along at least a part of its total length.

12. An apparatus in accordance with claim 11, wherein the unit-assembly elements are made of a plastic.

References Cited
UNITED STATES PATENTS

| | | | |
|---|---|---|---|
| 3,511,613 | 5/1970 | Jones | 23—259 |
| 3,587,676 | 6/1971 | Oehlin et al. | 23—259 X |
| 3,752,651 | 8/1973 | Bush | 23—259 X |

JOSEPH SCOVRONEK, Primary Examiner

U.S. Cl. X.R.

23—253 R; 141—82, 130

UNITED STATES PATENT OFFICE
CERTIFICATE OF CORRECTION

Patent No. 3,832,140   Dated August 27, 1974

Inventor(s) Eckehard Lorch, Paul Sommer and Hansjorg Tschirky

It is certified that error appears in the above-identified patent and that said Letters Patent are hereby corrected as shown below:

Column 1, line 7, after "Ser. No. 247,052" insert :

claims priority, application Switzerland, April 29, 1971, No. 6351/71

Column 6, claim 1, line 68, "aparatus" should be:

apparatus

Signed and sealed this 11th day of February 1975.

(SEAL)
Attest:

RUTH C. MASON
Attesting Officer

C. MARSHALL DANN
Commissioner of Patents
and Trademarks